No. 825,489. PATENTED JULY 10, 1906.
C. L. SCOTT.
BLOCK MACHINE.
APPLICATION FILED JAN. 26, 1906.
2 SHEETS—SHEET 1.
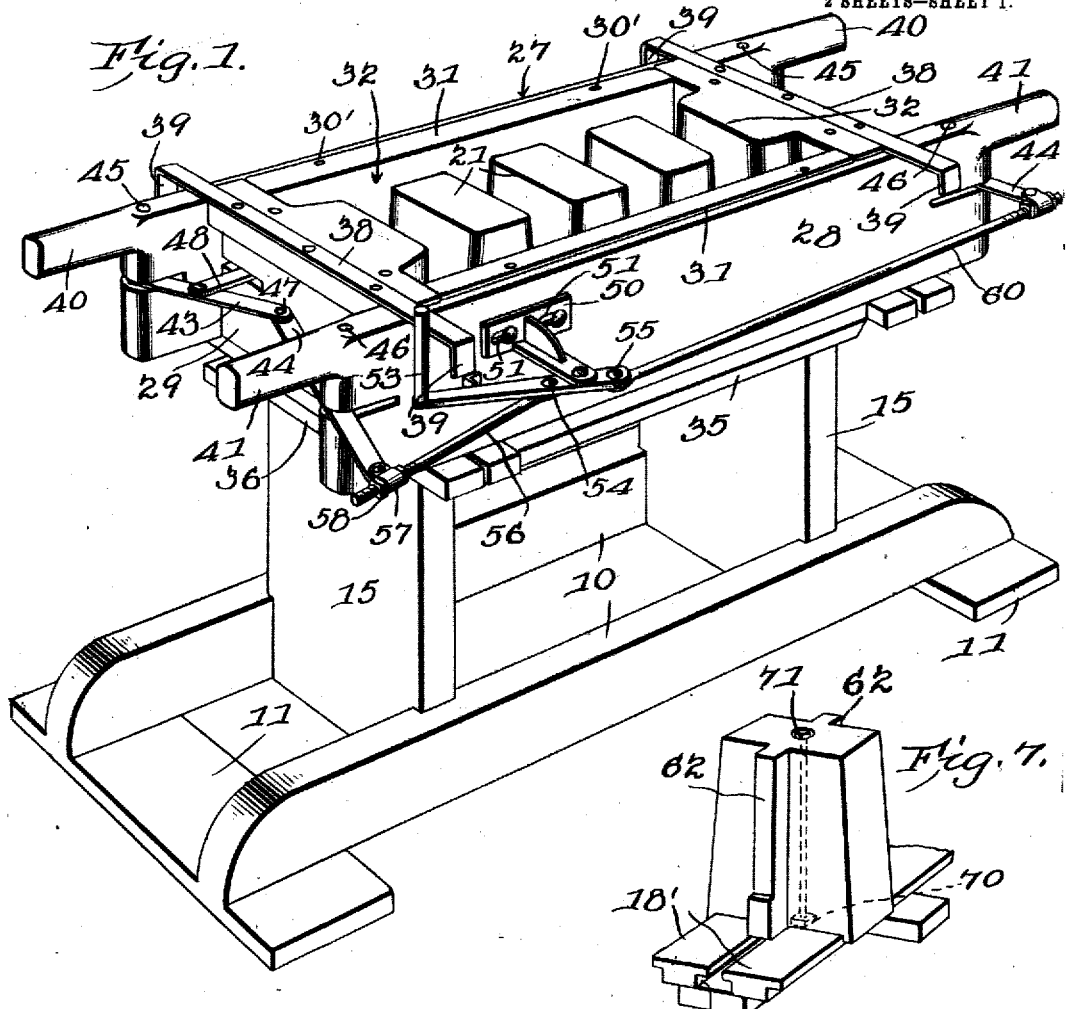
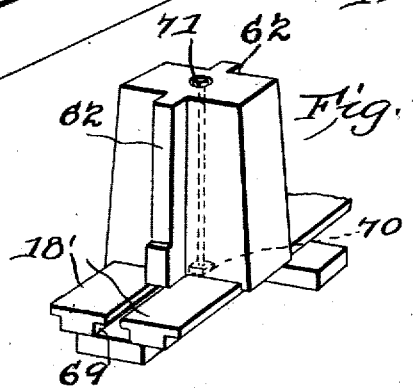
WITNESSES: Charles L. Scott, INVENTOR.
By C. A. Snow & Co.
ATTORNEYS No. 825,489. PATENTED JULY 10, 1906.
C. L. SCOTT.
BLOCK MACHINE.
APPLICATION FILED JAN. 26, 1906.
2 SHEETS—SHEET 2.
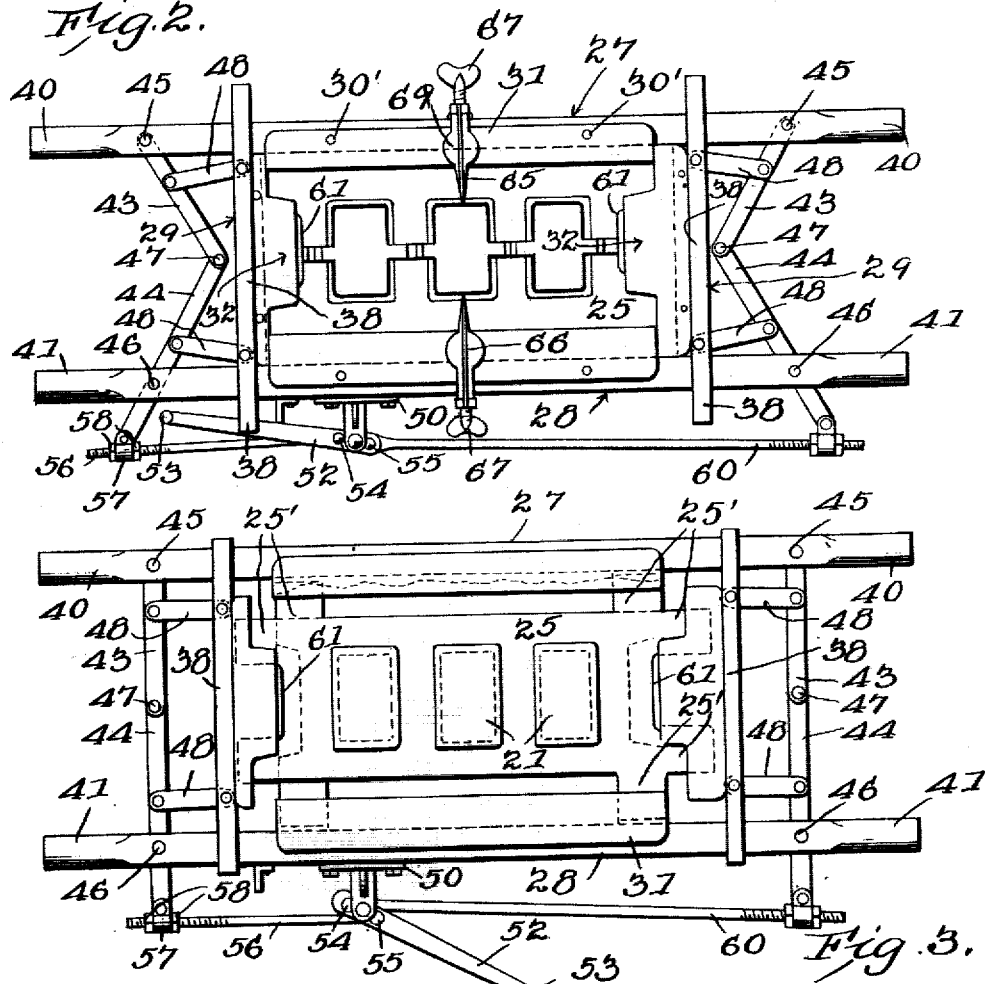
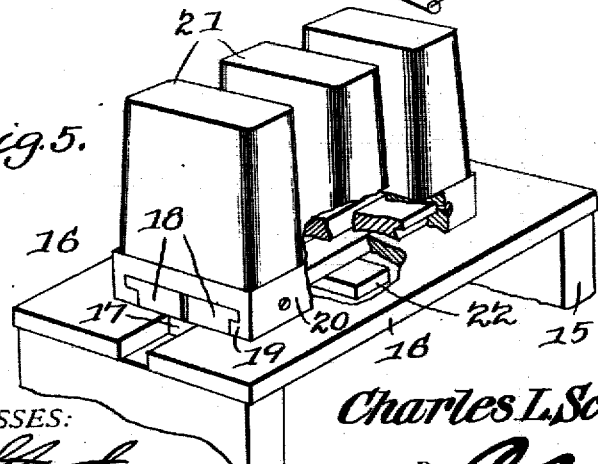
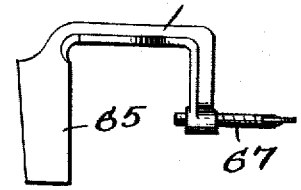
WITNESSES: Charles L. Scott, INVENTOR
By C. A. Snow & Co.
ATTORNEYS

UNITED STATES PATENT OFFICE.

CHARLES L. SCOTT, OF RICEVILLE, IOWA, ASSIGNOR TO C. L. SCOTT MFG. CO., OF RICEVILLE, IOWA.

BLOCK-MACHINE.

No. 825,489.  Specification of Letters Patent.  Patented July 10, 1906.

Application filed January 26, 1906. Serial No. 298,048.

*To all whom it may concern:*

Be it known that I, CHARLES L. SCOTT, a citizen of the United States, residing at Riceville, in the county of Howard and State of Iowa, have invented a new and useful Block-Machine, of which the following is a specification.

This invention relates to machines of that class employed for manufacturing building-blocks of concrete or other plastic material.

The principal object of the invention is to provide a machine of simple construction in which the core members are relatively stationary and the side and end walls are arranged for connection between the pallet, so that at the completion of a molding operation the side and end walls, together with the pallet, may be raised clear of the cores and the m lded block carried away to the drying-floor, after which the side and end members are moved to release position and detached, allowing the molded block to rest on the pallet.

A further object of the invention is to provide a machine of this type in which provision is made for moving all of the side and end walls away from the molded block simultaneously, each member moving in a direction at a right angle to that face of the block with which it engages.

A still further object of the invention is to provide a block-molding machine having movable side and end members, all of which are connected to a single operating-lever, which may be manipulated to move said members simultaneously to open or to closed position.

A still further object of the invention is to provide a machine of this type in which the pallet is of such construction as to form a guide for the side and end members of the mold-box during opening and closing movement.

A still further object of the invention is to provide a machine of this type in which the several side and end members are provided with detachable molding-plates which may be interchanged with other plates of different construction or of different contour for the purpose of forming specially-shaped blocks—as, for instance, corner-blocks—or for altering the contour or face ornamentation of the block.

A still further object of the invention is to provide a machine of this type in which the opposite ends of the block may be provided with recesses forming handholds to facilitate the handling of the block.

A still further object of the invention is to provide a novel form of division-plate to be employed in the manufacture of sectional blocks.

A still further object of the invention is to provide a machine having corner members of such construction as to permit the manufacture of a two-part block in which the members are united by transversely-extending bonds in the form of tie-wires or the like.

A still further object of the invention is to provide a novel form of core-support which will permit independent adjustment of the cores with relation to each other and will permit the ready interchanging of sets of cores in accordance with the character of the block to be made.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a perspective view of a block-molding machine constructed in accordance with the invention. Fig. 2 is a plan view of the upper portion of the machine with the parts in molding position and showing the division-plates. Fig. 3 is a view similar to Fig. 2, showing the side and end walls moved outward to release a finished block. Fig. 4 is a longitudinal sectional view of the upper portion of the machine. Fig. 5 is a detail perspective view of the main table, showing the detachable core-carrier and cores. Fig. 6 is a side elevation of one of the division-plates detached. Fig. 7 is a detail perspective view illustrating another form of core and a slightly-modified construction of core-attaching means Similar numerals of reference are employed to indicate corresponding parts throughout the several figures of the drawings.

The working parts of the machine are supported in a suitable frame, which includes a pair of longitudinal sills that are connected at their opposite ends by transversely-extending strips or planks 11, on which the operators may stand during the raising of the mold-box and finished block from the machine. The sills 10 serve as supports for a pair of vertically-disposed standards 15, at the upper ends of which is arranged a table formed of a pair of spaced strips 16. The longitudinal space or groove between the strips 16 is designed for the reception of a bar 17, to the upper face of which are secured two slightly-spaced core-carrying plates 18. The outer edges of the plates are provided with undercut resesses that are designed to receive the inturned lips 19 of the base members 20 of cores 21. The lips 19 are free to slide on the plates 18, in order that the cores may be adjusted to any desired position in the length of the plates and to permit the employment of one, two, three, or more cores, in accordance with the character of the block to be made, and the cores may be spaced at equidistant intervals or may be otherwise disposed. To the under side of the central portion of the bar 17 is pivoted a locking-bar 22, which may be turned at a right angle to the bar 17 and engage with the lower faces of the strips 16 for the purpose of holding the core-carrying plates and cores in position. By turning this bar 22 to a position parallel with the bar 17 the cores and their carrying-plates may be detached as a whole, in order that other plates and cores may be substituted therefor.

Over the cores is placed a pallet 25, having openings for the passage of the cores and provided at both its sides and ends with projecting bars 25', the said bars serving as guides for the movement of the side and end walls of the mold-box proper. The mold-box includes two side walls 27 and 28 and two end walls 29 and 30, and the upper edge of each of these walls is provided with two or more vertically-disposed studs 30', that are designed to enter suitable openings formed in the upper flanges 31 of detachable molding-plates 32, the lower edges of the plates being provided with flanges 33, that extend back to the inner face of the mold-walls proper, in order to prevent displacement of the molding-plates during the tamping of the concrete or other plastic material. These molding-plates 32 are interchangeable, each machine being provided with a large number of sets of plates, in order that the contour of the block may be altered—as, for instance, in the manufacture of corner-blocks or sectional blocks—or in order to alter the surface ornamentation of the block, and these mold-plates are readily detached, being merely held by the studs or pins 30, so that one set of plates may be lifted out and another substituted therefor at a moment's notice.

The side walls 27 and 28 of the mold-box are provided with depending flanges 35, that fit between the projections 25' of the pallet, and these projections form guides, so that the side walls can only move in direct lines toward and away from position, and there will be no danger of injuring the molded faces of the block when the mold-box is opened. In similar manner the end walls 29 and 30 are provided with depending flanges 36, which are also guided by projections 25' of the pallet, but the projections 36 of the end walls also extend under the ends of the pallet—as shown, for instance, in Fig. 4—so that when the mold-box is closed the flanges 36 will serve as supports to hold said pallet in position above the table 16 and will further serve to support the pallet when the mold-box as a whole is raised clear of the cores for the purpose of carrying off a molded block to the drying floor. The side and end walls are also guided to some extent and their outward movement is limited by strips 38, that are secured to the upper edges of the end walls and project beyond the side walls, the ends of said strips being provided with depending arms 39, which by engagement with the outer faces of the side walls limit the movement thereof. The side walls project for some distance beyond the end walls and are provided with handles 40 41, conveniently arranged so that two operators standing on the transverse planks 11 may grasp the handles and raise the mold-box, the pallet, and the finished block clear of the cores. The extended portions of these side walls are slotted, and through these slots extend levers 43 and 44. The levers 43 are pivoted on pins 45 in the side member 27, and the levers 44 are pivoted on pins 46, carried by the side member 28. The inner ends of these levers are connected together by a pin 47, and each lever is connected by links 48 to the adjacent end wall of the mold-box.

On the outer face of the side member 28 is secured a bracket 50, the base of the bracket being provided with slots 51 for the passage of securing-bolts, by which it is held to said side member, and the slots permit of any necessary adjustment of the position of the bracket. To the outer end of the bracket is pivoted an operating-lever 52, having a suitable handle 53 at its free end. Adjacent to the pivot or fulcrum point of the lever 52 are two pivot-pins 54 and 55, that are disposed, respectively, on opposite sides of the lever-fulcrum. The pin 54 is connected by a rod 56 to the outer end of the lever 44, the connection being formed by a sleeve 57, that is pivoted to the outer end of lever 44 and encircles the rod 56, said sleeve being adjustable with respect to the rod and being locked in its adjusted position by nuts 58. The pivot-pin 55 is connected to the opposite lever 44 in similar manner by a rod 60.

In the operation of the device as thus far described the parts are assembled in the position shown in Figs. 1 and 2, with the parts of the mold-box closed and a pallet in position. The concrete or other plastic material is then filled in and tamped in the usual manner, the surplus material being troweled off level with the tops of the cores and the mold-box. Two operators then stand on the transverse plank 17 and grasp the handles 40 and 41. The mold-box, the pallet, and the molded block are then raised clear of the cores and carried as a whole to the drying-floor, after which the lever 52 is moved to the position shown in Fig. 3, and this movement is transmitted through the rods 56 and 60 to the end levers and links, the levers 43 and 44 being moved into alinement with each other and spreading the side members, while the links 48 draw the end members away from the molded block, all of the vertical walls of the mold-box moving outward in a direction at a right angle from the faces of the block. This separates the side and end walls from the molded block and frees the pallet, and the block will be allowed to remain on the pallet until in condition for use. The side and end walls are then carried back to the machine, and after a new pallet has been placed in position the operating-lever is again moved to the position shown in Figs. 1 and 2, closing the mold and placing the same in condition for the reception of another quantity of plastic material. To permit convenient handling of the blocks when placing the same in position in a mold, the mold-plates which form the end air-spaces or bonding-spaces are provided with projections 61, which form recesses in the ends of the block, and these recesses afford handholds, so that the block may be readily lifted and carried.

It is in many cases desirable to form building-blocks of a sectional character—that is to say, blocks in which the front and rear walls are separated from each other for the purpose of forming continuous air-spaces—so that the wall will remain dry and the conduction of heat be minimized. For this purpose the core embers may be of the character shown in Fig. 7—that is to say, provided with laterally-projecting tongues 62, which when the cores are in position in the mold will be spaced from each other for a distance sufficient to permit the passage of tie-wires or similar bonding members, and each block will therefore be formed of two separate members united by metallic bonds and so arranged that the two sections may be handled as one block.

It is in many cases necessary to form sectional blocks, and for this purpose division-plates 65 are used. These division-plates, as shown in Figs. 2 and 6, are arranged at the ends of arms 66, that extend over the side walls of the mold and have downwardly-projecting portions arranged for the reception of screws 67. By turning the screws and binding the same against the outer face of the mold-box sections the division-plates may be held firmly in place in any position in the length of the mold-box, so that sectional blocks of any desired size may be formed.

In Fig. 7 is illustrated a slight modification of the core-support. In this case the plates 18' have their inner edges provided with recesses 69 for the reception of heads of nuts or bolts 70, the bolts extending upward through openings formed in the core proper and being provided with wrench-engaging heads 71. This construction permits of the adjustment of the core members to any desired position in the length of the core-support, and by turning the bolts said core members may be firmly locked in adjusted position.

I claim—

1. In a block-molding machine, a pallet having spaced projections extending from both of its sides and its ends, and side and end mold-box members having depending portions which fit between said projections, whereby said members are held from independent play in the direction of their lengths, said mold-box members being free to move in straight lines toward and from molding position.

2. In a block-molding machine, side and end members arranged to move outward in directions at right angles to the faces of the molded block, the side members having extended end portions, levers pivotally connected to the extended portions and to each other, an operating-lever having a fulcrum carried by one of said side members, a rod connecting the operating-lever to the sets of connected levers, and links extending from said connected levers to the end members.

3. In a block-molding machine, side and end members, all of which are movable toward and from molding position, pivotally-connected levers connecting two of the parallel members, means for moving said levers into alinement with each other to spread said members and to move the levers to angular position to draw the members toward each other, and means connecting said levers to the remaining members, whereby all of the members are simultaneously moved when the levers are operated.

4. In a block-molding machine, a mold-box having movable side and end members, an operating-lever supported by one of said members, and a system of levers and links connecting the operating-lever to all of said members to effect simultaneous movement of the latter.

5. In a block-molding machine, the combination with side members having extended portions, of levers pivoted to such extended portions and to each other, end members, links connecting the end members to the levers, a bracket adjustably secured to one of the side members, an operating-lever fulcrumed to said bracket, a pair of oppositely-directed rods extending from the operating-lever to the sets of connected levers, and having adjustable connections with the latter.

6. In a block-molding machine, movable side and end members having vertically-disposed studs, and face-plates having laterally-extended flanges provided with openings for the reception of said studs.

7. In a block-molding machine, movable side and end members having vertically-disposed studs at their upper edges, detachable face-plates having upper and lower flanges, the lower flanges abutting against the inner walls of the members, and the upper flanges having openings for the reception of said studs.

8. The combination with a mold-box, of spaced supporting-plates, core-carrying plates, a bar connecting said plates, a locking-bar pivoted to the connecting-bar and serving to lock the latter in position, and cores supported by the carrying-plates.

9. The combination with a mold-box, of a core-support having undercut recesses or grooves, cores having inwardly-extending lugs engaging in said recesses or grooves, and slidable lengthwise of the support, and means for locking said cores in adjusted position.

In testimony that I claim the foregoing as my own I have hereto affixed my signature in the presence of two witnesses.

CHARLES L. SCOTT.

Witnesses:
JOHN ANDREWS
E. R. ST. JOHN.